United States Patent
Knutsson et al.

(10) Patent No.: US 9,636,590 B2
(45) Date of Patent: May 2, 2017

(54) ADAPTIVE GAME OBJECT ALTERATION

(71) Applicant: KING.COM LIMITED, St. Julians (MT)

(72) Inventors: Sebastian Knutsson, Stockholm (SE); Mihai Alin Dindareanu, Bucharest (RO); Hinrik Asgeirsson, Bucharest (RO)

(73) Assignee: KING.COM LTD., St. Julians (MT)

(*) Notice: Subject to any disclaimer, the term of this patent is extended or adjusted under 35 U.S.C. 154(b) by 0 days.

(21) Appl. No.: 14/270,724

(22) Filed: May 6, 2014

(65) Prior Publication Data
US 2015/0321099 A1 Nov. 12, 2015

(51) Int. Cl.
| | |
|---|---|
| A63F 9/24 | (2006.01) |
| A63F 13/80 | (2014.01) |
| A63F 13/52 | (2014.01) |
| A63F 3/00 | (2006.01) |
| A63F 3/04 | (2006.01) |
| A63F 13/30 | (2014.01) |
| A63F 13/46 | (2014.01) |

(52) U.S. Cl.
CPC .......... *A63F 13/80* (2014.09); *A63F 3/00643* (2013.01); *A63F 3/0423* (2013.01); *A63F 13/30* (2014.09); *A63F 13/52* (2014.09); *A63F 13/46* (2014.09)

(58) Field of Classification Search
CPC ................... A63F 13/10; A63F 3/0423; A63F 2003/0428; A63F 9/0098; A63F 13/12; A63F 2003/00996; A63F 2011/0062; A63F 3/00643; A63F 2003/0426; A63F 2001/0466; A63F 2001/0483; A63F 2003/00867; A63F 2300/407; A63F 3/0402; A63F 3/0421; A63F 2001/0458; A63F 2003/00716; A63F 2250/1063; A63F 3/00574; G09B 17/00

See application file for complete search history.

(56) References Cited

U.S. PATENT DOCUMENTS

| | | | | |
|---|---|---|---|---|
| 2002/0193162 | A1* | 12/2002 | Walker | A63F 13/12 463/42 |
| 2004/0048646 | A1* | 3/2004 | Visocnik | 463/16 |
| 2005/0035549 | A1* | 2/2005 | Zeng | 273/292 |
| 2005/0261044 | A1* | 11/2005 | Persidsky | 463/9 |
| 2006/0128461 | A1* | 6/2006 | Okada | 463/25 |
| 2008/0187890 | A1* | 8/2008 | Podurgiel | 434/129 |
| 2009/0280883 | A1* | 11/2009 | Haveson | 463/9 |

\* cited by examiner

*Primary Examiner* — Justin Myhr
(74) *Attorney, Agent, or Firm* — Saul Ewing LLP (57) ABSTRACT

In an embodiment there is provided a device having a user interface configured to display a game board having a plurality of first objects, each first object having one or more characteristics stored in at least one memory, said user interface being configured to receive user input, and at least one processor in connection or communication with at least one memory configured to display a game board having a plurality of first game objects, each object having one or more characteristics, detect a selection sequence of at least one first game object with respect to said displayed game board in response to user input, generate a second object having default second object characteristics, alter the second object characteristics in dependence on at least one predetermined rule, and display said second object. The rule may comprise determining a game state comprising game data that is monitored to alter the second object characteristics.

16 Claims, 7 Drawing Sheets

ADAPTIVE GAME OBJECT ALTERATION

FIELD OF THE INVENTION

Some embodiments may relate to controlling a user interface responsive to user engagement with displayed game objects on the interface of a computer device.

BACKGROUND OF THE INVENTION

There are many technical challenges and technical considerations facing the designer of computer games executed on user or computer devices having a user interface when considering user engagement. Engagement involves designing gameplay to be engaging and rewarding to players. This typically requires games to be easily understood at their simplest or introductory levels, control inputs should provide rewarding gameplay with simple to complex game mechanics, which may become progressively more challenging so that players are not frustrated or bored, but remain engaged to develop rewarding skills.

Effective engagement may also require various forms of feedback to reinforce the user or player sense of success and accomplishment, especially when the user or player appears to be struggling or "stuck" at a certain level, part of a level, quest or saga in a game. So called "Boosters" are one example of aid that may be provided to such users.

The above may, but not exclusively, apply to "casual games" played on portable or mobile platforms with differing and in some cases limited computing, display and input resources.

SUMMARY OF THE INVENTION

According to a first aspect, there is provided a computer implemented method of controlling a user interface responsive to user engagement with a displayed game board on said interface, the method comprising the following implemented by at least one processor of a computer device in communication with said interface and at least one memory: displaying a game board having a plurality of first objects, each object having one or more characteristics, on said display, detecting a selection sequence of at least one game object with respect to said displayed game board in response to user input, generating a second object having default second object characteristics, altering the second object characteristics in dependence on at least one predetermined rule, and displaying said second object.

According to second aspect there is provided a device having a user interface configured to display a game board having a plurality of first objects, each first object having one or more characteristics stored in at least one memory, said user interface being configured to receive user input, and at least one processor in connection or communication with at least one memory configured to display a game board having a plurality of first game objects, each object having one or more characteristics, detect a selection sequence of at least one first game object with respect to said displayed game board in response to user input, generate a second object having default second object characteristics, alter the second object characteristics in dependence on at least one predetermined rule, and display said second object.

In an embodiment of the above aspects, the at least one rule may comprise determining a game state comprising game data based on one or more of at least the following: lives left in level, time left in level, moves left in level, time spent in level, number of attempted retries at level to meet level objective.

In another embodiment, the at least one rule may comprise determining a game state comprising game data based on one or more of at least the following: overall progress within a saga, cumulative number of attempted retries within a saga portion, user activity within other related games.

In the above embodiments, the second object may comprise a gift or a booster to aid game completion and/or user engagement.

The game state may be monitored and the second object characteristics may be further altered dynamically in response to the game state.

Hence, dynamic altering of second game objects such as boosters or aids contingent on aspects of game state is provided thereby improving user engagement.

The game data comprising said game state may further comprise user data. For example, the number of games that the user plays may be provided, and the second objects provided may cross from one game to another as part of the dynamic allocation and adjustment.

User statistics including friends, and number of tournaments or messages sent may also comprise game state data utilised for the alteration of a generated or proffered second game item in the form of a gift or booster.

Booster default characteristics may depend on the gameboard and game environment in which they are being deployed. For example a "bomb" or "line blaster" booster may be utilised in game genres that require elimination of first game objects (e.g. letter tiles, candys or peppers) in order to progress.

Alternatively, or in addition, in some embodiments boosters may comprise a score indicator or level achievement indicator such as a "star", which when activated may aid the user or player to achieve the level, or saga, or mission objectives.

However, the simple generation of such boosters may not be appropriate given the context of a game state. For example, providing a booster comprising an increase of time available, or number or moves remaining to meet a target may not be appropriate in contexts in which the player has almost reached the target. Similarly, offering an extra life to a player having many lives already may not be appreciated and lead to lower user engagement.

Hence, dynamically altering the proffered or generated second object characteristics in such contexts would be useful and may re-engage users.

In an embodiment, the dynamic altering of the characteristics of the booster is not visible to the user, thereby creating surprise and increased engagement once the booster is activated.

The boosters may be altered versions of the currently displayed booster, or may be altered and replace the currently displayed version, such that a more powerful line blaster simply appears as a line blaster, but the alteration of the type of booster may be indicated if for example the line blaster was altered to become for example an additional moves or score booster characteristic.

In other embodiments, the altered characteristics may be applied to a first object to provide a second object for display. Hence a first object, (e.g. a letter tile or a jewel depending on the game and context) may be transformed to a second object having altered characteristics that provide benefit, such as score or time enhancements, or a level pass within a saga game. The display of said second object may comprise displaying said first object with an indication of the altered characteristics. The altered characteristics may be subsequently activated in response to selection.

In another embodiment, the activation of said second object may be stored as game state data and utilised in the subsequent generation of second game objects.

The altered characteristics may be applied to a first object to provide a second object for display, thereby transforming a first object into a second object with additional booster like or bonus characteristics. The display of said second object may comprise displaying said first object with an indication of the altered characteristics.

According to yet another aspect, there is provided a computer readable storage device storing instructions that, when executed by a processor, causes said processor to perform the following steps: display a game board having a plurality of first game objects, each object having one or more characteristics, detect a selection sequence of at least one first game object with respect to said displayed game board in response to user input, generate a second object having default second object characteristics, alter the second object characteristics in dependence on at least one predetermined rule, and display said second object.

According to another aspect, there is provided a program comprising program code instructions that, when executed by a processor, causes said processor to perform the following steps: display a game board having a plurality of first game objects, each object having one or more characteristics, detect a selection sequence of at least one first game object with respect to said displayed game board in response to user input, generate a second object having default second object characteristics, alter the second object characteristics in dependence on at least one predetermined rule, and display said second object.

These and other features are as claimed in the appended claims.

BRIEF DESCRIPTION OF DRAWINGS

To understand some embodiments, reference will now be made by way of example only to the accompanying drawings, in which.

DETAILED DESCRIPTION OF THE INVENTION

The techniques described herein may be implemented in, by way of example only, a computer implemented tile based word game such as "Alphabetty™" of the applicant, which involves selecting game objects in the form of letter tiles to make words to score points against either a target or another player in a tournament or other multiplayer environment.

Other examples to which the techniques herein apply include match-3 type games such as Candy Crush Saga, Pepper Panic and the like where a player ascends through a map of levels ("saga") to achieve objectives of the saga or quest game.

Figure 1:
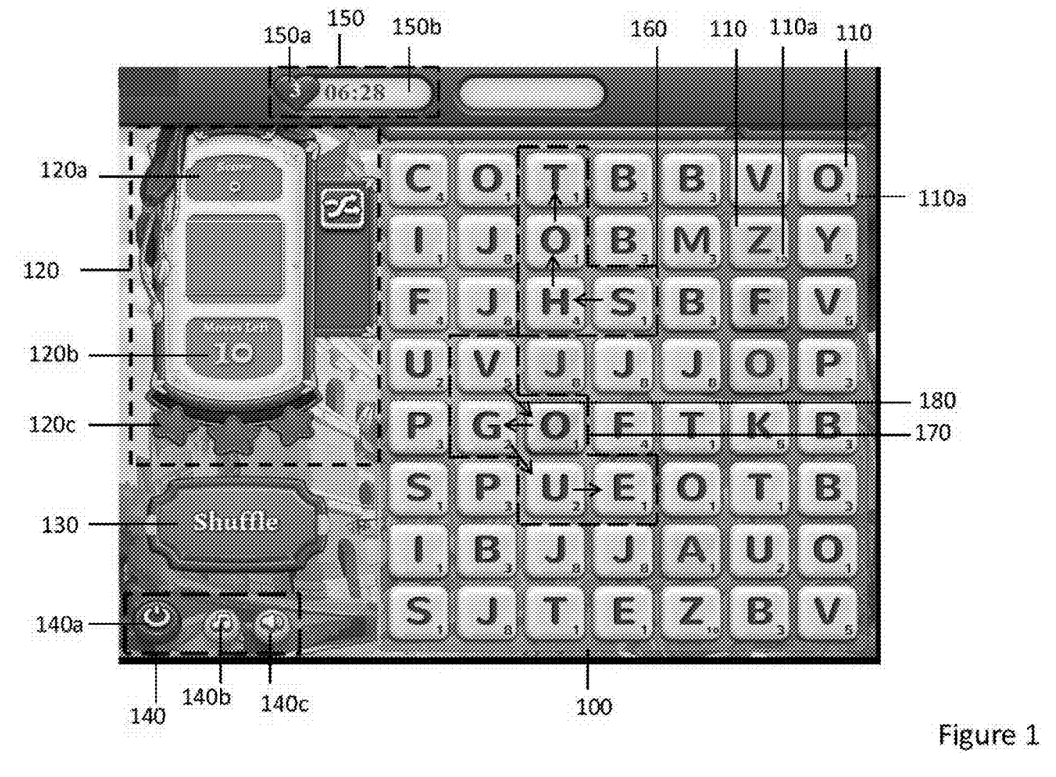
FIG. 1 shows an example embodiment of a game board.

FIG. 1 shows an example game board of a letter tile based computer implemented game according to an embodiment.

The game board 100 or playable area 100 is displayed upon which are disposed game objects 110. The game objects 110 in this embodiment comprise letter tiles which may have varying characteristics. The characteristics may be one or more of colour, shape, and/or different scores 110a per object or tile 110. In this embodiment, the objects 110 are square letter tiles arranged in a rectangular grid like fashion, although in other embodiments other game board configurations and other game object shapes or tiles may be utilized.

In some embodiments, the game is implemented so that a level or a game session is completed when a certain target is reached by the user.

The target may comprise achieving a certain score by selecting tiles 110 to make words, each word scoring a total score at least in part in dependence on each of the individual tile scores 110a selected. The game can in some embodiments end if the player or user runs out of time 150b or moves 120b before managing to reach a designated target (not shown).

The game board 100 may have a number of game objects 110 having different characteristics 110a aligned in rows and columns, such as a 7×8 grid as shown in FIG. 1. Other grid sizes may be suitable. In such an embodiment the game objects on the game board have three, five or eight nearest or adjacent neighbouring game object tiles.

Other game board layouts or configurations may be provided. For example, triangular, pyramidal, hexagonal, octagonal or other layouts comprising position spaces or tiles within the game board 100 may be provided for display.

The game board 100 may be accompanied by a region 120 indicating a current score 120a, a number of moves remaining 120b, and stars that are awarded to a player when completing a level 120c as shown in the Figure.

There may also be provided control or optional actional items 130, 140, here shown as a shuffle control 130, and a game reset or off control 140a, music 140b and sound or volume control 140c.

The game board 100 may in some embodiments be accompanied by a region 150 indicating a timer or countdown 150b and a number of lives 150a remaining to the player.

The gameboard 100 shows region 160 in which a word may be formed. For example, region 160 indicates the word S-H-O-T being selected by individual selection of the game objects tiles 110, forming the word "shot" scoring a total of seven points. The forming of the word "shot" here involves only horizontal and vertical movement or selection via touch input.

Gameboard 100 of FIG. 1 also shows an example region 170 wherein the word "Vogue" is spelt. As can be seen, to create this word scoring 11 points, requires diagonal selection of neighbouring object tiles 100, as shown by arrow 180 indicated in figure.

When a word is selected, the tiles or first game objects creating that word are eliminated, that is they are removed from the game board and typically replaced, either by a "drop down" mechanic from the top of the game board to the bottom, or generally simply replaced in-situ.

Hence, one objective may be to score a certain number of points 120a, whereas another objective may be to remove a fixed number of tiles. This could be within a fixed number of moves 120b or within a preset time 150.

These general concepts may apply to other casual games such as for example those similar to Candy Crush™.

Figure 2:
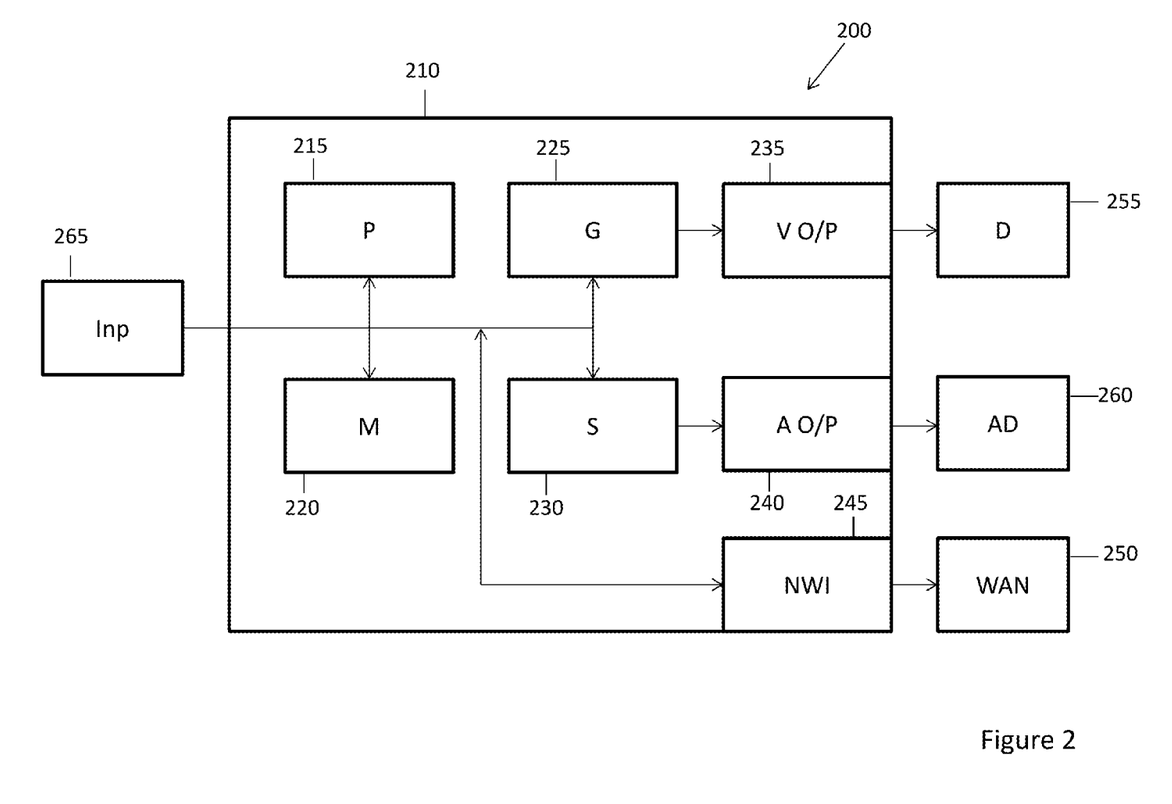
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
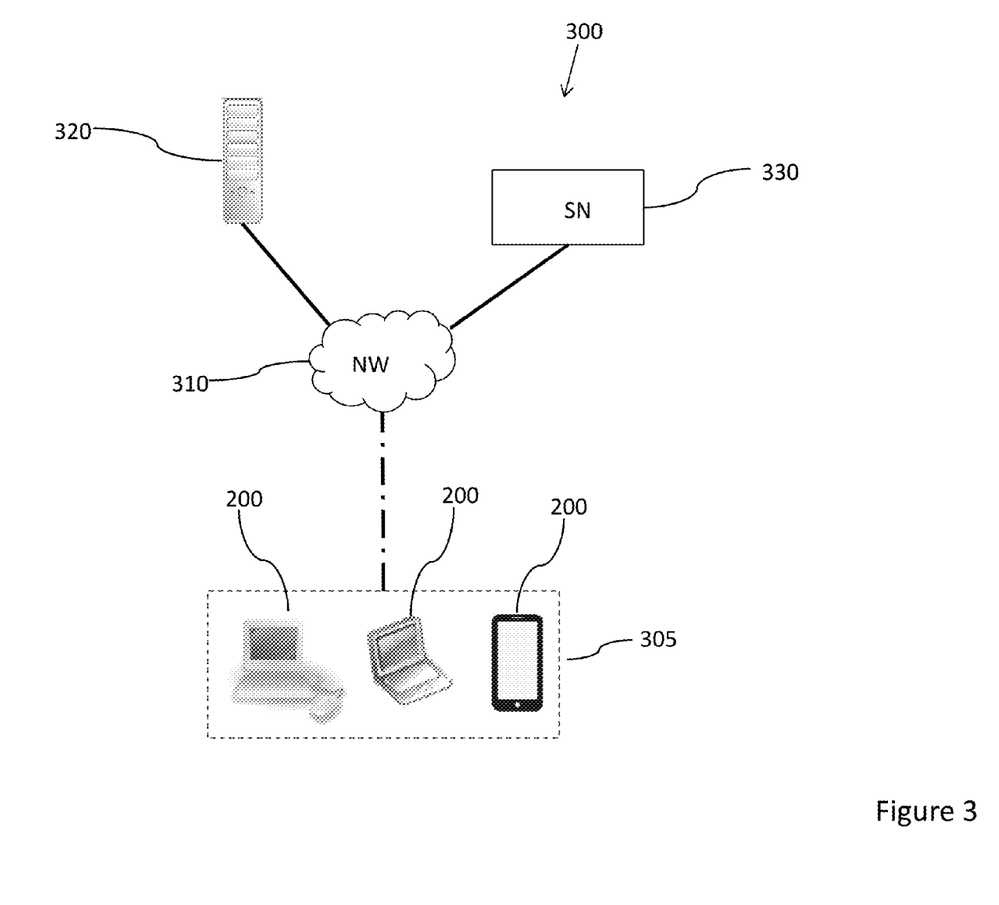
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Embodiments will now be described with reference to FIG. 4 and FIGS. 5a, and 5b.

Figure 4:
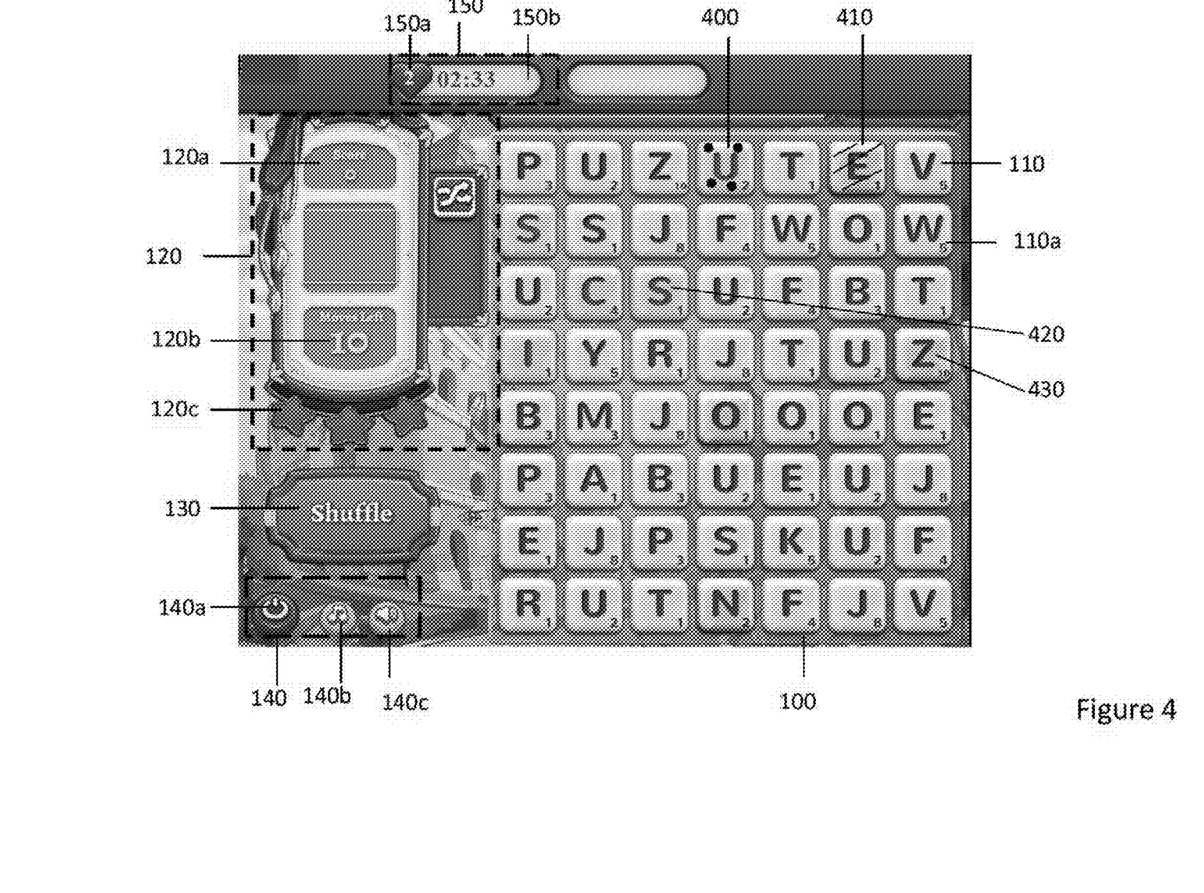
FIG. 4 depicts a gameboard according to some embodiments.

FIG. 4 shows an example game board 100 as per FIG. 1, comprising game objects 110. The Figure also shows an example of second game objects 400, 410. A second game object 400, depicted in the Figure as a letter tile "U" in the Figure, has a default characteristic in the form of a booster that will reward a user with a double score (indicated by the spots on the tile 400 in the Figure) should the game object 400 be included in a selection making a word. The second game object 410 has a default characteristic comprising a booster that indicates for example a line blaster characteristic (indicated by way of example only in the Figure by diagonal lines for clarity) which may eliminate all game objects sharing the same row (i.e. the first row of the game board 100 in the Figure). The alteration of the default characteristics of second game objects 400, 410 may be dependent on player input and game state as will be described later.

FIG. 4 indicates by shading other second game objects 420, 430 imbued with default second game object characteristics such as a double score 420 if included in a selection, or a triple score 430 if included. Although the Figure shows the second game objects graphically represented in a similar fashion to the first game objects, those skilled in the art will appreciate that the second objects, whether gifts, boosters or some other object with characteristics to aid level, saga or game completion may be graphically represented differently to the first game objects, which may depend on the context of the game.

Figure 5:
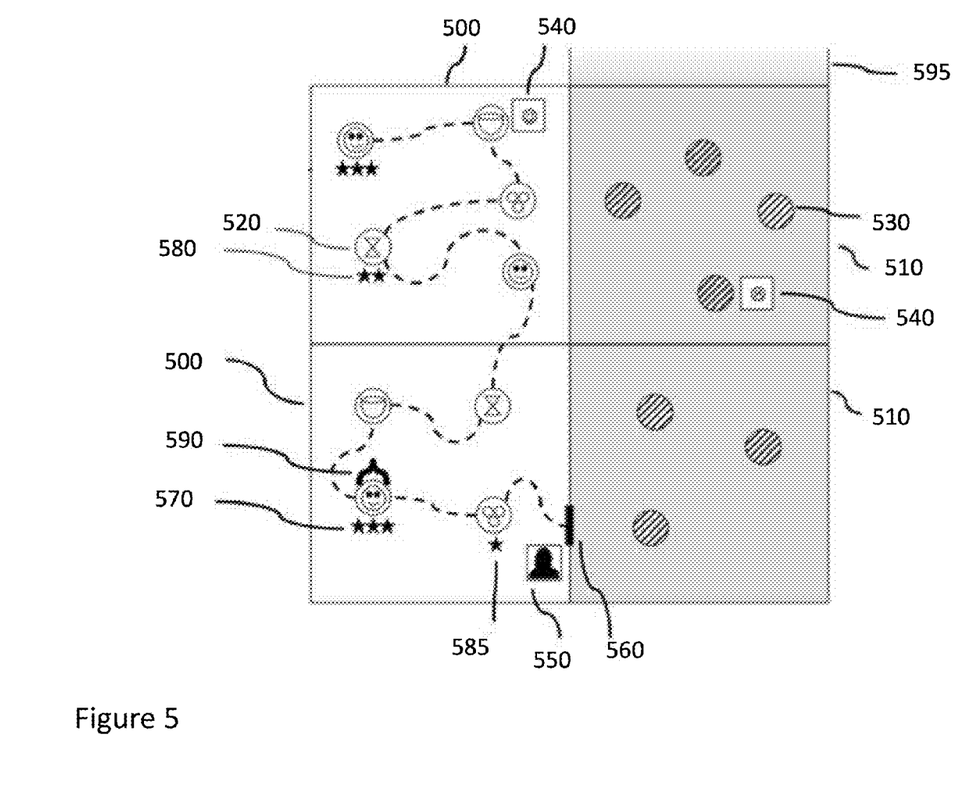
FIG. 5 illustrates a map or saga level.

FIG. 5 shows an embodiment of a so called "Saga" game, wherein a virtual map layout of a game environment, displayed on the screen of the computing device 100 used by the game player is provided. As the player progresses through the levels in the game, progress is represented as a journey along a path on the virtual map. Representing progress in this manner provides an additional layer of engagement for players, and also opportunities for viralisation and monetisation.

The virtual map consists of stages 500, 510 with varying number of levels 520, 530, represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 595 can be added by the game designers at any time—so a game may be launched with perhaps twenty levels, and after a number of weeks, there may be fifty or sixty levels present.

Stages in the game can be both locked and unlocked.

In some embodiments, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some embodiments, certain levels and stages may be locked based on other criteria than the player's linear progression in the game. Such levels can for instance be based on the total score the player has achieved on all levels, the average performance on levels or on the number of friends that the player has invited to play the game.

In one implementation, one challenge 560 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player may also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

The request for help is sent to the friend who then has the option to accept to help.

The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in these embodiments of the game.

In addition to the virtual map layout in FIG. 5, there can also be other levels or stages that are not part of the progress along the path in the virtual map. Such stages or levels can be present in the game associated with the virtual map at all times or can be unlocked when the user reaches a certain in-game achievement.

This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 5 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level of the user 550. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends who meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 570, 580, 585 in FIG. 5.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 590 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 520 can for instance be in the form of an object related to the game goal, such as an hourglass representing a level with a time constraint.

Before starting a level, players have to select which level to play from the map view which may indicate levels or stages where boosters will be awarded 540. When selecting a level, the player is shown information about the level, such as the amount of points needed, the available boosters that can be used, the goal of the level and also the high scores of friends who have previously played that level.

In an embodiment of the above aspects, the at least one rule may comprise determining a game state comprising game data based on one or more of at least the following: lives left in level, time left in level, moves left in level, time spent in level, number of attempted retries at level to meet level objective.

In another embodiment, the at least one rule may comprise determining a game state comprising game data based on one or more of at least the following: overall progress within a saga, cumulative number of attempted retries within a saga portion, user activity within other related games.

In the above embodiments, the second object may comprise a gift or a booster to aid game completion and/or user engagement.

The game state may be monitored and the second object characteristics may be further altered dynamically in response to the game state.

Hence, dynamic altering of second game objects such as boosters or aids contingent on aspects of game state is provided thereby improving user engagement.

The game data comprising said game state may further comprise user data. For example, the number of games that the user plays may be provided, and the second objects provided may cross from one game to another as part of the dynamic allocation and adjustment.

User statistics including friends, and number of tournaments or messages sent may also comprise game state data utilised for the alteration of a generated or proffered second game item in the form of a gift or booster.

Booster default characteristics may depend on the gameboard and game environment in which they are being deployed. For example a "bomb" or "line blaster" booster may be utilised in game genres that require elimination of first game objects (e.g. letter tiles, candys or peppers) in order to progress.

Alternatively, or in addition, in some embodiments boosters may comprise a score indicator or level achievement indicator such as a "star", which when activated may aid the user or player to achieve the level, or saga, or mission objectives.

However, the simple generation of such boosters may not be appropriate given the context of a game state. For example, providing a booster comprising an increase of time available or number or moves remaining to meet a target may not be appropriate in contexts in which the player has almost reached the target. Similarly, offering an extra life to a player having many lives already may not be appreciated and lead to lower user engagement.

Hence, dynamically altering the proffered or generated second object characteristics in such contexts would be useful and may re-engage users.

In an embodiment, the dynamic altering of the characteristics of the booster is not visible to the user, thereby creating surprise and increased engagement once the booster is activated.

The boosters may be altered versions of the currently displayed booster, or may be altered and replace the currently displayed version, such that a more powerful line blaster simply appears as a line blaster, but the alteration of the type of booster may be indicated if for example the line blaster was altered to become for example an additional moves or score booster characteristic.

Figure 6:
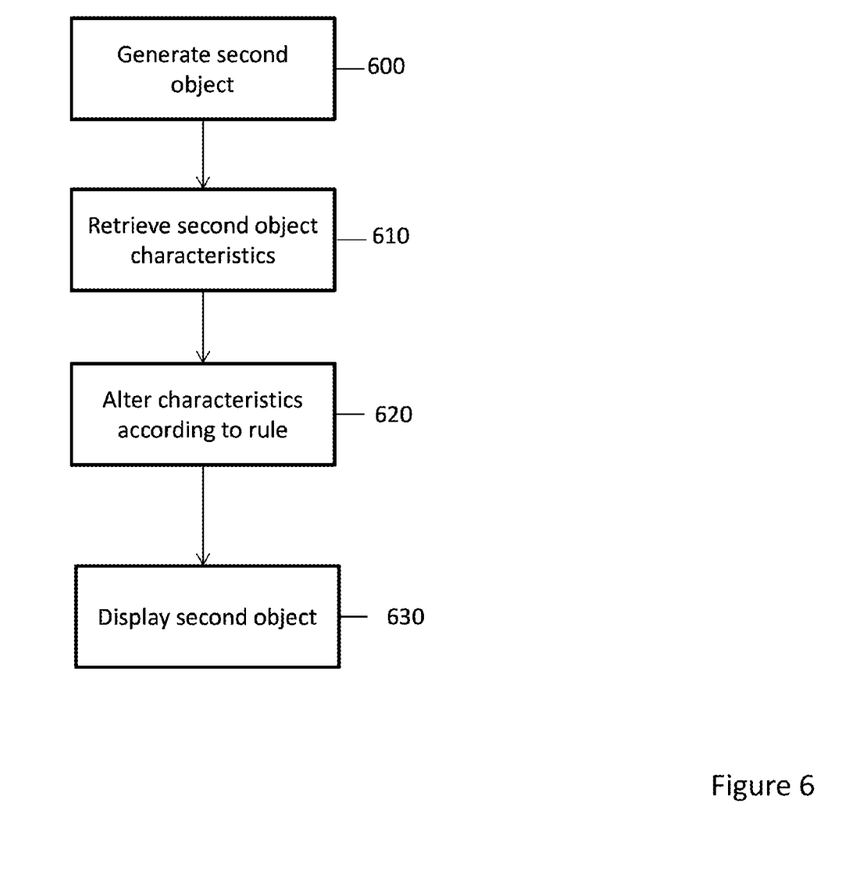
FIG. 6 is a flowchart depicting steps of a method according to an embodiment.

FIG. 6 illustrates steps of an embodiment of a method in a second object is generated at step 600, such as booster in the form of a "bomb", and the default characteristics for that type of second object (e.g. destroys all adjacent game objects when selected) are retrieved at step 610.

The processor 215, 320 subsequently alters the default characteristics according to a rule at step 620. The rule comprises, in one embodiment, the monitoring of the game state comprising game data based on one or more of at least the following: lives left in level, time left in level, moves left in level, time spent in level, number of attempted retries at level to meet level objective.

In another embodiment, the at least one rule may comprise determining a game state comprising game data based on one or more of at least the following: overall progress within a saga, cumulative number of attempted retries within a saga portion, user activity within other related games.

The characteristics of the second object are thus dynamically altered 620 and the second game object is displayed at step 630.

Hence, dynamic altering of second game objects such as boosters or aids contingent on aspects of game state is provided thereby improving user engagement.

The second game objects may be initially generated randomly, or based on time or other game state data available.

The game data comprising said game state may further comprise user data. For example, the number of games that the user plays may be provided, and the second objects provided may cross from one game to another as part of the dynamic allocation and adjustment.

User statistics including friends, and number of tournaments or messages sent may also comprise game state data utilised for the alteration of a generated or proffered second game item in the form of a gift or booster.

Figure 7:
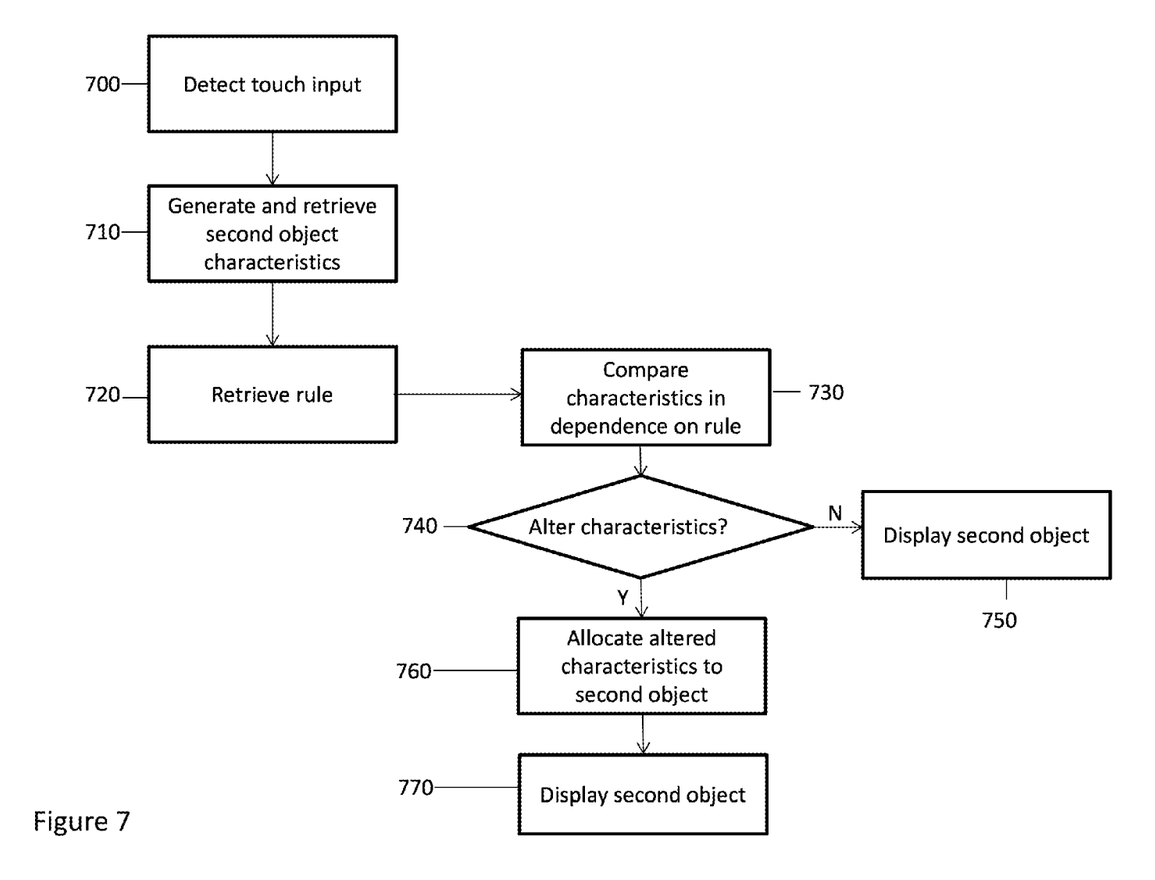
FIG. 7 is a flowchart depicting steps of a method according to another embodiment.

FIG. 7 illustrates another embodiment of a method in which the processor 215 monitors user interface 255, 265 of device 200 and detects initial touch or "start of touch" input at step 700, and subsequently at step 710 generates a second object and retrieves its default characteristics.

The processor 215, 320 subsequently retrieves from for example memory 220 a rule at step 720 which bases the characteristics of the second object on current game state as previously described.

At step 730 the characteristics currently retrieved are compared with the rule, and a decision at step 740 is made thereon as to whether to alter the characteristics. For example, the booster has a default characteristic of adding a number of moves to the move counter. However, comparison with the game state at step 730 reveals that the user currently has many moves left and so the default characteristic is altered (Y) at step 740 wherein the processor flows to step 760 to allocate the altered characteristics and to display the second object at step 770. If the comparison at step 740 is negative, the processor follows the "N" path to step 750 where the second object is displayed with its associated default characteristics.

The alteration may comprise offering a time bonus rather than a number of moves, or may involve changing the type of the booster to another type such as a bomb or line blaster with associated characteristics to enable better scoring and to keep the user engaged.

In some embodiments the allocated characteristics may be hidden from the user, thereby providing surprise when activated.

The generated second object may be chosen from a pool of stored objects 220, 320 which monitors the game state and dynamically alters the characteristics of the second objects in play in dependence on the game state.

In another embodiment, a continuous selection of a sequence of three or more first game objects causes said processor 215 to select at least one other game object 400 not forming part of the current selection for allocation of a new characteristic, and the at least one other game object 400 may be selected randomly in some variations.

Hence the selection of three or more game objects 110 may be rewarded with the allocation of an altered characteristic such as a bonus indicator to another game object 400, 410, with the future selection of that other game object 400,410 providing the reward.

The altered characteristic may comprise one or more of a variable indicating a portion of a target, or a booster.

The new characteristics may comprise boosters which may apply double or triple scores, or stars and/or other boosters to the allocated tile 400, 410.

The booster may comprise, for example, a line blaster such that subsequent inclusion of the at least one other game object 400, 410 in a selection comprising a word also eliminates game object tiles 110 in a row, column or both occupied by said at least one other game object.

Hence, a first game object may be imbued with characteristics of a second game object (i.e. "upgraded") with visual clues to the user that such has occurred.

In an embodiment, the allocation of said altered characteristic may comprise a graphical representation such as for example a star or horizontal or vertical or both indicators on the at least one other object 400, 410 to indicate the new characteristic to the user or player on said user interface.

In an embodiment, the at least one memory 220, 320 may store characteristics of the game objects 110, and may further store said second game object characteristics for allocation 400, 410.

Hence game mechanics which may encourage engagement and completion of a level or game board, saga or mission, are provided.

Some embodiments may allow for synchronisation of for example game states between different devices or platforms.

The game may for instance be played in an offline mode on a handheld device 200, 305 using locally stored information on the handheld device 200, 305. The device may store all or some of the levels that are available. Some of the features may be locally executed on the device 200, 305. This may for instance implement a scheme to regenerate lives after a certain period of time, the time may be locally decided based on the clock on the device 200, 305. In some embodiments, the central game server 320 clock may override the local clock when the local device 200 has been synchronised with the server 320.

Some embodiments may be implemented to synchronize game state information 120, 150 and/or retrieve and connect to social graph information and user profile data on a social network 330 such as Facebook or Google+.

Some embodiments may be implemented to enable connection to a plurality of social networks 330. The user may be given the option to select which information may be derived and/or shared with which social network 330.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A computer implemented method of controlling a display responsive to user engagement via a user interface with a displayed game board on said display, the method comprising the following implemented by at least one processor of a computer device in communication with said interface, said display and at least one memory:

the processor causing to be displayed on the display a computer implemented game comprising a game board having a plurality of first game objects, each first game object having one or more characteristics, said computer implemented game being associated with at least one game objective, generating a second game object using said at least one processor, the second game object having a default second object characteristics, and displaying said second game object on the display, in association with said game board;

detecting a selection sequence using the at least one processor configured to detect a selection sequence of at least one first game object with respect to said displayed game board in response to user input via the user interface, monitoring a current game state of the computer implemented game by the at least one processor, said game state associated with the at least one game objective, using a rule to determine that the default second object characteristic is to be altered to a different second object characteristic based on the current game state, wherein the altered second object characteristic is selected from a plurality of available object characteristics, the altered second object characteristic being determined by the processor to be more useful to a user in achieving said game objective based on said current game state;

altering the second object characteristics of the second object; and using said second object during game play with said altered characteristic.

2. A method according to claim 1, wherein said monitoring a game state comprises monitoring, by the processor, game data based on one or more of at least the following: lives left in level, time left in level, moves left in level, time spent in level, number of attempted retries at level to meet level objective.

3. A method according to claim 1, wherein said monitoring a game state comprises monitoring, by the processor, game data based on one or more of at least the following: overall progress within a saga, cumulative number of attempted retries within a saga portion, user activity within other related games.

4. A method according to claim 1, wherein said second object comprises a gift or a booster object.

5. A method according to claim 1, wherein the game state is further monitored by the processor and the second object characteristics are further altered dynamically by the processor in response to the game state.

6. A method according to claim 1, wherein the altered second object characteristics are activated in response to the selection of said second object in dependence on user input.

7. A method according to claim 6, wherein the activation of said second object is stored as game state data and utilised in the subsequent generation of second game objects.

8. A device having:
a display configured to display via a user interface a computer-implemented game, said user interface being configured to receive user input, and
at least one processor in connection or communication with at least one memory configured to display on the display a game board having a plurality of first game objects, each first game object having one or more characteristics stored in the at least one memory, said computer implemented game being associated with at least one game objective
generate a second game object having a default second object characteristic, and display on the display said second game object, in association with said game board;
detect a selection sequence of at least one first game object with respect to said displayed game board in response to user input via the user interface,
monitor a current game state of the computer implemented game, said game state associated with the at least one game objective;
use a rule to determine that the default second object characteristic is to be altered to a different second object characteristic based on the current game state, wherein the altered second object characteristic is selected from a plurality of available object characteristics, the altered second object characteristic being determined by the at least one processor to be more useful to a user in achieving said game objective based on said current game state;
alter the second object characteristics of the second object; and
use said second object during game play with said altered characteristic.

9. A device according to claim 8, wherein said monitoring of a game state comprises monitoring game data stored in said at least one memory and based on one or more of at least the following: lives left in level, time left in level, moves left in level, time spent in level, number of attempted retries at level to meet level objective.

10. A device according to claim 8, wherein said monitoring of a game state comprises monitoring game data stored in said at least one memory and based on one or more of at least the following: overall progress within a saga, cumulative number of attempted retries within a saga portion, user activity within other related games.

11. A device according to claim 8, wherein said second object comprises a gift or a booster object stored in said at least one memory.

12. A device according to claim 8, wherein the game state is further monitored by said at least one processor and the second object characteristics are further altered dynamically in response to the game state.

13. A device according to claim 12, wherein the further altered characteristics are provided in memory and retrieved in response to said game state.

14. A device according to claim 8, wherein the altered characteristics are activated in response to the selection of said second object in dependence on user input.

15. A device according to claim 14, wherein the activation of said second object is stored as game state data and utilised in the subsequent generation of second game objects.

16. A computer readable non-transitory storage device storing instructions that, when executed by a processor, causes said processor to perform the following steps:
displaying on a display a computer implemented game comprising a game board having a plurality of first game objects, each first game object having one or more characteristics, said computer implemented game being associated with at least one game objective;
generating a second game object having a default second object characteristic, and displaying on the display said second game object in association with said game board;
detecting a selection sequence of at least one first game object with respect to said displayed game board in response to user input via a user interface on the display,
monitoring a current game state of the computer implemented game, said game state associated with the at least one game objective;
using a rule to determine that the default second object characteristic is to be altered to a different second object characteristic based on the current game state, wherein the altered second object characteristic is selected from a plurality of available object characteristics, the altered second object characteristic being determined by the processor to be more useful to a user in achieving said game objective based on said current game state;
altering the second object characteristics of the second object; and
using said second object during game play with said altered characteristic.

* * * * *